United States Patent Office 3,264,251
Patented August 2, 1966

3,264,251
LOW MODULUS RUBBER MATERIALS AND
THE PREPARATION THEREOF
Jerry T. Gruver, Bartlesville, Okla., assignor to Phillips
Petroleum Company, a corporation of Delaware
No Drawing. Filed July 31, 1961, Ser. No. 127,871
14 Claims. (Cl. 260—41)

This invention relates to a method of curing polymeric materials to produce low modulus rubber stocks. One aspect of this invention relates to a process of reacting polymeric materials and highly acidic carbon blacks in an improved curing system. Another aspect of this invention relates to the resulting cured products of this process. In another aspect, this invention relates to a method of curing polymeric materials with multi-functional aziridinyl compounds, organic peroxides and acidic carbon blacks and the cured products thereof. Still another aspect of this invention relates to the combination of the vulcanizable mixture of the polymeric material, the aziridinyl compound, the organic peroxide and the acidic carbon black. In a still further aspect, this invention relates to a method of utilizing acidic carbon blacks as reinforcing agents for polymeric materials.

For a number of purposes there is a need for low modulus rubbers. One area in which there is an increasing demand for such low modulus rubbers is in the manufacture of "no squeal" tires for passenger vehicles. It has been observed that acidic carbon blacks, particularly attrited blacks of low structure, when used as reinforcing agents in compounding of rubber, results in a marked reduction in the modulus of the cured stock. However, when used in conventional compounding procedures, these acidic carbon blacks frequently retard the cure.

It has now been discovered that natural rubbers and synthetic rubbers such as conjugated diene homopolymers, copolymers of conjugated dienes with compounds containing a vinyl group, and copolymers of monoolefins such as ethylene-propylene and ethylene-butadiene copolymers and the like, combined with highly acidic carbon blacks can be cured to low modulus rubbers by the incorporation in the recipe of an aziridinyl compound and an organic peroxide.

Therefore, it is an object of this invention to provide an imprvoed method of curing polymeric materials with highly acidic carbon blacks. Another object of this invention is to provide a process wherein polymeric materials and highly acidic carbon blacks can be reacted with curatives to produce an improvement in the physical properties of the material. Another object is to provide a polymeric material having improved physical properties as a result of the addition of highly acidic carbon black and being reacted with a two-component curing system. Other aspects and several advantages of this invention will be apparent from a study of the disclosure and the appended claims.

The materials which can be treated for improvements in properties according to this invention are natural rubber and synthetic rubbery polymers of conjugated diene monomers. Included among these polymers are homopolymers of conjugated dienes having from 4 to 12 carbon atoms, preferably the polymers of conjugated dienes having 4 to 8 carbon atoms per molecule, such as:

1,3-butadiene
Isoprene
Piperylene
Methylpentadiene
2-methyl-1,3-hexadiene
Phenylbutadiene
3,4-dimethyl-1,3-hexadiene
4,5-diethyl-1,3-octadiene
Chloroprene
Fluoroprene and the like. Among these, butadiene, isoprene and piperylene are preferred. In addition, suitable materials include copolymers of the above-mentioned conjugated dienes with compounds containing a vinylidene group, such as isobutylene, styrene, p-methoxystyrene, vinylnaphthalene, vinyltoluene, heterocylic nitrogen-containing monomers such as pyridine and quinoline derivatives containing at least one vinyl or alpha-methylvinyl group, such as 2-vinylpyridine and 2-methyl-5-vinylpyridine, acrylic and alkacrylic acid esters, such as methyl acrylate, ethyl acrylate, and methyl methacrylate, methyl vinyl ether, vinyl chloride, vinylidene chloride, and the like. Polymers containing acidic groups along the polymer chain, such as polymers of acrylic acid or methacrylic acid copolymerized with diene monomers can also be cured with this system. The invention is also applicable to the compounding and curing of saturated rubbery polymers such as ethylene-propylene polymers, polyisobutylene and the like.

The aziridinyl-substituted compounds employed in this invention include 1-aziridinyl-2,4,6-triphospa-1,3,5,-triazines. These can be represented by the formula

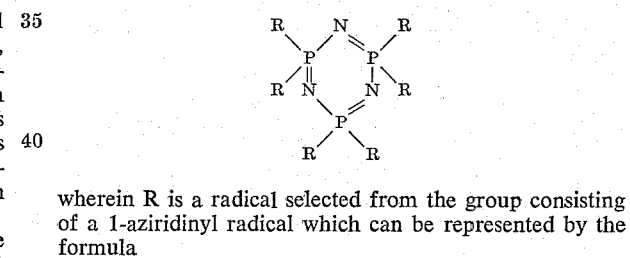

wherein R is a radical selected from the group consisting of a 1-aziridinyl radical which can be represented by the formula

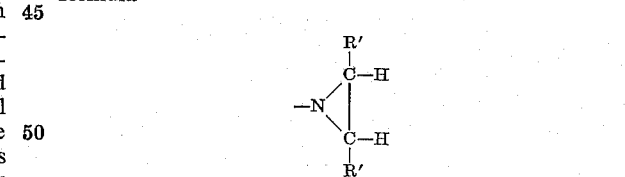

hydrogen, an alkyl, cycloalkyl, aryl, aralkyl, and alkaryl radical, each hydrocarbon radical containing from 1 to 12 carbon atoms, the R' radicals are selected from the group consisting of hydrogen, alkyl, cycloalkyl, aryl, aralkyl, and alkaryl radicals, and R' can be alike or different, the R's in each aziridinyl radical containing up to and including a total of 20 carbon atoms and P is phosphorus. In the foregoing formula, at least two of the R groups are 1-aziridinyl radicals. Thus, two of the R groups in the formula are aziridinyl radicals.

Examples of compounds represented by the formula include the following:

2,4-di(1-aziridinyl)2,4,6-triphospha-1,3,5-triazine
2,4-di(1-aziridinyl)6-methyl-2,4,6-triphospha-1,3,5-triazine
2,4-di(2-methyl-1-aziridinyl)6-methyl-2,4,6-triphospha-1,3,5-triazine
2,4-di(2,3-dimethyl-1-aziridinyl)2,4,6-triphospha-1,3,5-triazine
2,4-di(2-ethyl-3-isopropyl-1-aziridinyl)6-benzyl-2,4,6-triphospha-1,3,5-triazine
2,4-di(2-n-butyl-3-(3-methylcyclohexyl)1-aziridinyl)2,4,6-triphospha-1,3,5-triazine
2,4-di(2-tert-butyl-3-benzyl-1-aziridinyl)6-benzyl-2,4,6-triphospha-1,3,5-triazine
2,4-di(2-nonyl-3-cyclopentyl-1-aziridinyl)6-n-propyl-2,4,6-triphospha-1,3,5-triazine
2,4-di(2-heptyl-3-(2,4-dimethylphenyl)1-aziridinyl)6-pentadecyl-2,4,6-triphospha-1,3,5-triazine
2,4-di(2-dodecyl-1-aziridinyl)-6-ethyl-2,4,6-triphospha-1,3,5-triazine
2,4-di(2-ethyl-3-(3-n-propylphenyl)1-aziridinyl)2,4,6-triphospha-1,3,5-triazine
2,4-di(2-amyl-3-benzyl-1-aziridinyl)6-amyl-2,4,6-triphospha-1,3,5-triazine
2,4-di(2,3-dibenzyl-1-aziridinyl)6-benzyl-2,4,6-triphospha-1,3,5-triazine
2,4-di(2-phenyl-3-tetradecyl-1-aziridinyl)6-phenyl-2,4,6-triphospha-1,3,5-triazine
2,4-di(2,3-diheptyl-1-aziridinyl)6-cyclopentyl-2,4,6-triphospha-1,3,5-triazine
2,4-di(2,3-dicycloheptyl-1-aziridinyl)6-methyl-2,4,6-triphospha-1,3,5-triazine
2,4-di(2-(2-methylcyclopentyl)1-aziridinyl)6-cyclohexyl-2,4,6-triphospha-1,3,5-triazine
2,4-di(2,3-diethyl-1-aziridinyl)6-tert-butyl-2,4,6-triphospha-1,3,5-triazine
2,4-di(2,3-diisopropyl-1-aziridinyl)6-decyl-2,4,6-triphospha-1,3,5-triazine
2,4-di(2-cyclopropyl-3-cycloheptyl-1-aziridinyl)2,4,6-triphospha-1,3,5-triazine
2,4-di(2,3-dinonyl-1-aziridinyl)6-phenyl-2,4,6-triphospha-1,3,5-triazine
2,4-di(2,3-didecyl-1-aziridinyl)6-decyl-2,4,6-triphospha-1,3,5-triazine
2,4,6-tri(1-aziridinyl)2,4,6-triphospha-1,3,5-triazine
2,4,6-tri(2-methyl-1-aziridinyl)2,4,6-triphospha-1,3,5-triazine
2,4,6-tri(2,3-dimethyl-1-aziridinyl)2,4,6-triphospha-1,3,5-triazine
2,4,6-tri(2-isopropyl-1-aziridinyl)2,4,6-triphospha-1,3,5-triazine
2,4,6-tri(2-methyl-3-ethyl-1-aziridinyl)2,4,6-triphospha-1,3,5-triazine
2,4,6-tri(2-methyl-3-n-butyl-1-aziridinyl)2,4,6-triphospha-1,3,5-triazine
2,4,6-tri(2-hexyl-1-aziridinyl)2,4,6-triphospha-1,3,5-triazine
2,4,6-tri(2,3-diheptyl-1-aziridinyl)2,4,6-triphospha-1,3,5-triazine
2,4,6-tri(2-methyl-3-octyl-1-aziridinyl)2,4,6-triphospha-1,3,5-triazine
2,4,6-tri(2-ethyl-3-decyl-1-aziridinyl)2,4,6-triphospha-1,3,5-triazine
2,4,6-tri(2-dodecyl-1-aziridinyl)2,4,6-triphospha-1,3,5-triazine
2,4,6-tri(2-methyl-3-tridecyl-1-aziridinyl)2,4,6-triphospha-1,3,5-triazine
2,4,6-tri(2-ethyl-3-octadecyl-1-aziridinyl)2,4,6-triphospha-1,3,5-triazine
2,4,6-tri(2-eicosy-1-aziridinyl)2,4,6-triphospha-1,3,5-triazine
2,4,6-tri(2-methyl-3-cyclopentyl-1-aziridinyl)2,4,6-triphospha-1,3,5-triazine
2,4,6-tri(2-ethyl-3-cyclohexyl-1-aziridinyl)2,4,6-triphospha-1,3,5-triazine
2,4,6-tri(2-n-butyl-3-(4-methylcyclohexyl)1-aziridinyl)2,4,6-triphospha-1,3,5-triazine
2,4,6-tri(2-phenyl-1-aziridinyl)2,4,6-triphospha-1,3,5-triazine
2,4,6-tri(2-phenyl-3-tetradecyl-1-aziridinyl)2,4,6-triphospha-1,3,5-triazine
2,4,6-tri(2,3-diphenyl-1-aziridinyl)2,4,6-triphospha-1,3,5-triazine
2,4,6-tri(2-tert-butyl-3-phenyl-1-aziridinyl)2,4,6-triphospha-1,3,5-triazine
2,4,6-tri(2-ethyl-3-(1-naphthyl)1-aziridinyl)2,4,6-triphospha-1,3,5-triazine
2,4,6-tri(2-n-propyl-3-(2-naphthyl)1-aziridinyl)2,4,6-triphospha-1,3,5-triazine
2,4,6-tri(2-methyl-3-benzyl-1-aziridinyl)2,4,6-triphospha-1,3,5-triazine
2,4,6-tri(2-nonyl-3-benzyl-1-aziridinyl)2,4,6-triphospha-1,3,5-triazine
2,4,6-tri(2-n-propyl-3-(2-phenylethyl)1-aziridinyl)2,4,6-triphospha-1,3,5-triazine
2,4,6-tri(2-methyl-3-(4-methylphenyl)1-aziridinyl)2,4,6-triphospha-1,3,5-triazine
2,4,6-(2-ethyl-3-(3-n-propylphenyl)1-aziridinyl)2,4,6-triphospha-1,3,5-triazine
2,4,6-tri(2-heptyl-3-(2,4-dimethylphenyl)1-aziridinyl)2,4,6-triphospha-1,3,5-triazine
2,4,6-tri(2,3-diethyl-1-aziridinyl)2,4,6-triphospha-1,3,5-triazine
2,4,6-tri(2-methyl-3-isopropyl-1-aziridinyl)2,4,6-triphospha-1,3,5-triazine
2,4,6-tri(2-tert-butyl-1-aziridinyl)2,4,6-triphospha-1,3,5-triazine
2,4,6-tri(2,3-didecyl-1-aziridinyl)2,4,6-triphospha-1,3,5-triazine
2,4,6-tri(2-ethyl-3-pentadecyl-1-aziridinyl)2,4,6-triphospha-1,3,5-triazine
2,4,6-tri(2-methyl-3-cyclohexyl-1-aziridinyl)2,4,6-triphospha-1,3,5-triazine
2,4,6-tri(2-phenyl-3-benzyl-1-aziridinyl)2,4,6-triphospha-1,3,5-triazine
2,4,6-tri(2-ethyl-3-phenyl-1-aziridinyl)2,4,6-triphospha-1,3,5-triazine
2,4,6-tri(2-amyl-3-benzyl-1-aziridinyl)2,4,6-triphospha-1,3,5-triazine 2,2,4,4,6,6 - hexa(2 - methyl - 1 - aziridinyl)2,4,6 - triphospha-1,3,5-triazine, hereinafter referred to as hexa-(2-methyl-1-aziridinyl)-triphospha-triazine,
2,2,4,4,6,6-hexa(1-aziridinyl)2,4,6-triphospha-1,3,5-triazine
2,2,4,4,6,6-hexa(2,3-diethyl-1-aziridinyl)2,4,6-triphospha-1,3,5-triazine
2,2,4,6-tetra(2-hexyl-1-aziridinyl)2,4,6-triphospha-1,3,5-triazine
2,2,4,4,6-penta(2-methyl-3-n-butyl-1-aziridinyl)2,4,6-triphospha-1,3,5-triazine
2,4,6-tri(2-methyl-1-aziridinyl)2,4,6-trimethyl-2,4,6-triphospha-1,3,5-triazine
2,2,4,6-tetra(2-isopropyl-1-aziridinyl)4,6-diethyl-2,4,6-triphospha-1,3,5-triazine
2,2,4,4,6-penta(2-methyl-3-n-butyl-1-aziridinyl)6-phenyl-2,4,6-triphospha-1,3,5-triazine
2,4,6-tri(2-ethyl-1-aziridinyl)2,4,6-tri(n-dodecyl)2,4,6-triphospha-1,3,5-triazine
2,4,6-tri(2,3-di-n-butyl-1-aziridinyl)2,4,6-tri(3-n-hexylphenyl)2,4,6-triphospha-1,3,5-triazine
2,4,6-tri(2,3-di-n-eicosyl-1-aziridinyl)2,4,6-tri(2-ethyl-4-cyclohexylbutyl)2,4,6-triphospha-1,3,5-triazine Organic peroxides used in conjunction with this invention have the general formula $$R''\!-\!O\!-\!O\!-\!R''$$

wherein each R'' is selected from the group consisting of alkyl, cycloalkyl, aryl, alkaryl, aralkyl, and acyl radicals containing from 1 to 15 carbon atoms. Examples of suitable organic peroxides include:

Dimethyl peroxide
Methyl ethyl peroxide
Di-tert-butyl peroxide
Di-tert-amyl peroxide
Di-n-hexyl peroxide
n-Butyl n-amyl peroxide
Dicyclohexyl peroxide
Dicyclopentyl peroxide
Di(methylcyclohexyl) peroxide
Diphenyl peroxide
Di-4-tolyl peroxide
Di(2,4,6-trimethylphenyl) peroxide
Phenyl benzyl peroxide
Tert-butyl phenyl peroxide
Dibenzoyl peroxide
Diacetyl peroxide
Dibenzyl peroxide
Bis(alpha-methylbenzyl) peroxide
Bis(alpha-ethylbenzyl) peroxide
Bis(alpha-n-propylbenzyl) peroxide
Bis(alpha-isopropylbenzyl) peroxide
Bis(alpha,alpha-dimethylbenzyl) peroxide, also referred to as dicumyl peroxide
Bis(alpha,alpha-diethylbenzyl) peroxide
Bis(alpha,alpha-di-n-propylbenzyl) peroxide
Bis(alpha,alpha-diisopropylbenzyl) peroxide
Bis(alpha-methyl-alpha-ethylbenzyl) peroxide
Bis(alpha-ethyl-alpha-isopropylbenzyl) peroxide
Bis(alpha-methyl-alpha-tert-butylbenzyl) peroxide
Bis(alpha,alpha-dimethyl-3-methylbenzyl) peroxide
Bis(alpha,alpha-diethyl-2-ethylbenzyl) peroxide
Bis(alpha-methyl-alpha-ethyl-3-tert-butylbenzyl) peroxide
Bis(alpha,alpha-dimethyl-2,4-dimethylbenzyl) peroxide
Bis(alpha,alpha-dimethyl-4-isopropylbenzyl) peroxide
Bis(alpha,alpha-diisopropyl-4-ethylbenzyl) peroxide
Bis(alpha-methyl-alpha-ethyl-4-isopropylbenzyl) peroxide
Bis(alpha,alpha-diethyl-4-isopropylbenzyl) peroxide
Bis(alpha,alpha-diisopropyl-2-ethylbenzyl) peroxide
Bis(alpha,alpha-dimethyl-4-tert-butylbenzyl) peroxide
Bis(alpha,alpha-diethyl-4-tert-butylbenzyl) peroxide
Benzyl alpha-methylbenzyl peroxide
Benzyl alpha-methyl-4-methylbenzyl peroxide
Benzyl alpha-methyl-4-isopropylbenzyl peroxide
Benzyl alpha,alpha-dimethylbenzyl peroxide
Benzyl alpha,alpha-4-trimethylbenzyl peroxide
Benzyl alpha,alpha-dimethylbenzyl-4-isopropylbenzyl peroxide
Alpha,alpha,alpha'-trimethyldibenzyl peroxide
Alpha-methyl-alpha,alpha'-diethyl-alpha'-n-propyldibenzyl peroxide
Alpha-methyl-alpha,alpha',alpha'-triisopropyl-dibenzyl peroxide
Alpha,alpha-dimethyl-alpha',alpha'di-n-butyldibenzyl peroxide
Bis[dimethyl(1-naphthyl)methyl] peroxide
Bis[diethyl(2-naphthyl)methyl] peroxide The amount of acidic carbon black used as a reinforcing agent in this invention is generally within the range from 20 to 100 parts by weight per 100 parts of polymer with about 40 to 60 parts being preferable. The amount of the aziridinyl compound used will be in the range from 0.1 to 2.5 parts per hundred parts of polymer. The amount of the organic peroxide employed is in the range from 0.1 to 10.1 parts per hundred parts of polymer, with 0.25 to 7.5 parts per hundred parts rubber being preferable.

The carbon blacks employed in the present invention are those having a pH value in the range from 2 to 6. Attrited carbon blacks having acidic properties may be used in this invention. The term "attrited carbon blacks" is used here to define carbon blacks that have been subjected to severe mechanical treatment, in which the secondary aggregates have been destroyed. Suitable blacks can be obtained by any of the various processes or treatments known to the art. One procedure by which highly acidic, low structure carbon blacks can be prepared involves subjecting a furnace black to vigorous milling in the presence of oxygen as in a succession of passes through a tight roll mill, in a ball mill, an ink mill or by similar means. By such treatment the secondary aggregates are altered and in the presence of oxygen, acidic properties are imparted thereto. Channel black and furnace blacks oxidized by air or chemical agents are also applicable in the process if their pH value falls in the range specified.

The pH value of the carbon black used in this invention is measured by ASTM procedure D-1512-57T modified by using 25 ml. water per gram of carbon black instead of 10 ml. and shortening the heating period to 10 minutes after which the water is cooled to room temperature and the pH is measured by use of a Beckman pH meter.

Incorporation of the acidic carbon black and other components of the recipe in the rubber is effected on a roll mill, in a Banbury mixer or by any similar means known to the art. The aziridinyl and peroxidic materials may be added directly to the compounding recipe or they can be applied to the acidic carbon black prior to its incorporation in the rubber, e.g., by treating the black with a hydrocarbon solution of the additive.

The curing or reacting temperature can vary over a broad range, for example from 200 to 500° F., although the temperature is generally in the range of 260 to 350° F. The time can also vary considerably from a few minutes to several hours, although usually a curing time of from 20 to 150 minutes is used. One skilled in the art in possession of this disclosure, having studied the same, will recognize that it is possible to vary somewhat the amounts or ratios given, depending upon the particular polymer, reacting agent and result desired. Thus, the reacting agent or curative can be used in lesser or greater amounts than those given but this now is not preferred. Thus, one skilled in the art will recognize that a basic concept is in the use of the reactant or curative rather than in the parts by weight when considering the broad aspects of the invention. The temperature at which reaction with the polymer will take place, though given herein as now preferred, can be varied somewhat outside the limits given depending upon the particular circumstances as one skilled in the art in possession of this disclosure will understand. Thus, the concept of the invention is to bring about the reaction and this one skilled in the art will know how to do, having studied this disclosure.

This invention provides a method for converting liquid, semi-solid, and solid polymers to vulcanized rubbery and cross-linked plastic products. A wide variety of polymer compositions which can be obtained include materials which are suitable as adhesives, potting compounds, tread stocks, and various types of molded objects.

The following example is presented in illustration of the invention. However, the specific materials and conditions used are typical only and should not be construed to limit invention unduly.

Furnace carbon black was ball milled to produce an attrited carbon black having a pH of 4.5. The acidic carbon black was treated with hexa[1-(2-methyl)aziridinyl]triphosphatriazine (HMAT) in various concentrations. The HMAT was dissolved in toluene and contacted with the dried carbon black in glass bottles under nitrogen by rotating in a 50° C. bath for 24 hours. The carbon blacks were separated from the solution by centrifuging after which they were dried in a vacuum oven for 24 hours at 105° C. About 95 percent of the HMAT in the toluene solution was taken up by the carbon black. Data on the treating step are shown in Table I.

TABLE I

| Sample | Carbon Black (gm.) | Toluene (ml.) | HMAT (gm.) |
|---|---|---|---|
| 1 | 20 | 100 | 0.2 |
| 2 | 20 | 100 | 0.6 |
| 3 | 20 | 100 | 0.08 |
| 4 | 20 | 100 | 1.0 |
| 5 | 20 | | |

These treated carbon blacks were used in compounding cis-polybutadiene in a peroxide recipe, an untreated furnace carbon black being compounded using the same recipe as a control. Approximate values of the cis-polybutadiene used in the tests were: cis content 96%, trans content 1.2%, vinyl content 2.8%, Mooney value (ML–4 @ 212° F.) 45 and an inherent viscosity of 2.35. The compounding recipe included the organic peroxide, bis-($\alpha,\alpha'$-dimethylbenzyl)peroxide (Dicup 40C) which was incorporated in the polymer with the carbon black on a roll mill. All stocks were cured at 307° F. Data on these tests are shown in Table II.

TABLE II

| Run | Cis-poly-butadiene | Carbon black | | | | | | HMAT (percent)[1] | Dicup, 40° C. | Modulus, p.s.i. | Tensile, (p.s.i.) | Elong. (percent) | Shore Hardness | ΔT, (° F.) | Resilience, percent |
|---|---|---|---|---|---|---|---|---|---|---|---|---|---|---|---|
| | | Untreated | #3 | #1 | #2 | #4 | #5 | | | | | | | | |
| 1 | 100 | | | 50 | | | | 0.2 | 1.5 | 430 | 1,040 | 530 | 49 | 102.5 | 61.4 |
| 2 | 100 | | | | 50 | | | 0.6 | 1.5 | 680 | 2,080 | 580 | 56 | 54.7 | 72.4 |
| 3 | 100 | | | | | 50 | | 1.0 | 1.5 | 750 | 1,900 | 530 | 63 | 46.3 | 77.4 |
| 4 | 100 | | 50 | | | | | 0.08 | 1.5 | 280 | 520 | 510 | 45 | ([2]) | 53.7 |
| 5 | 100 | | | | | | 50 | None | 1.5 | 210 | 390 | 550 | 50 | ([2]) | 49.5 |
| 6 | 100 | 50 | | | | | | None | 1.5 | 1,290 | 2,600 | 470 | 63 | 61.5 | 71.5 |

[1] Concentration in treating solution.
[2] Materials too soft to obtain ΔT using conventional testing methods.

These data show that the attrited blacks lower the modulus significantly and that with increasing amounts of hexa[1-(2-methyl)aziridinyl]triphosphatriazine satisfactory tensiles are obtained with moduli remaining at lowered levels. Hysteresis values (ΔT) are very significantly lowered as the amount of treating agent is increased.

The term "low modulus rubber" is used in this disclosure to mean a rubber having a modulus of less than 1200 p.s.i. when speaking of cis-polybutadiene and styrene-butadiene copolymer and a modulus of less than 1000 when speaking of ethylene-propylene copolymer.

As will be apparent to one skilled in the art from the above disclosure, various modifications can be made in the invention without departing from the spirit or scope thereof.

I claim:

1. A process which comprises reacting a polymeric material selected from the group consisting of rubbery homopolymers of conjugated diene monomers having from 4 to 12 carbon atoms, and rubbery ethylene/propylene copolymers with an acidic carbon black and a combination of an organic peroxide and a reactant material selected from the group consisting of compounds having the formula

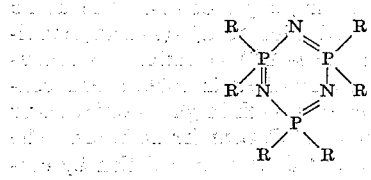

wherein R is a radical selected from the group consisting if 1-aziridinyl radicals which can be represented by the formula

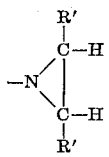

hydrogen, an alkyl, cycloalkyl, aryl, aralkyl, and alkaryl radical, each hydrocarbon radical containing from 1 to 12 carbon atoms, the R' radicals are selected from the group consisting of hydrogen, alkyl, cycloalkyl, aryl, aralkyl and alkaryl radicals, the R's in each aziridinyl radical containing up to and including a total of 20 carbon atoms, and where at least two of the R groups are 1-aziridinyl radicals and P is phosphorus.

2. A process according to claim 1 wherein the R' groups are identical.

3. A process according to claim 1 wherein the R' groups are different from each other.

4. A process according to claim 1 wherein the polymeric material is a polymer of butadiene.

5. A vulcanizable composition obtained by mixing 100 parts by weight of a polymeric material selected from the group consisting of rubbery homopolymers of conjugated diene monomers having from 4 to 12 carbon atoms, and rubbery ethylene/propylene copolymers, with from about 20 to 100 parts by weight of an acidic carbon black having a pH value of from 2 to 6, with about 0.1 to 10.1 parts by weight of an organic peroxide having the formula

R″—O—O—R″ wherein each R″ is selected from the group consisting of alkyl, cycloalkyl, aryl, alkaryl, aralkyl, and acyl radicals and contains 1 to 15 carbon atoms and about 0.1 to 2.5 parts by weight of a reactant material selected from the compounds of the formula.

6. A process of heating the resulting mixture of claim 5 to produce a cured product.

7. A process according to claim 6 wherein the curing temperature is within the range of from about 200 to 500° F. and the curing time is within the range of from about 20 to 150 minutes.

8. A composition according to claim 5 wherein said reactant material is hexa-(2-methyl-1-aziridinyl)-triphosphatriazine.

9. A composition according to claim 5 wherein the said organic peroxide is bis($\alpha,\alpha'$-dimethylbenzyl)peroxide.

10. A composition according to claim 5 wherein the said polymeric material is a polymer of butadiene.

11. The composition prepared by the process of claim 1.

12. The composition prepared by the process of claim 6.

13. A process according to claim 6 wherein the curing temperature is within the range from about 260 to 350° F. and the curing time is within the range from about 30 to 60 minutes and wherein the acidic carbon black is present in an amount of about 40 to 60 parts by weight per 100 parts of the polymer.

14. A vulcanizable composition obtained by mixing 100 parts by weight of rubbery polybutadiene polymer, with from about 20 to 100 parts by weight of an attrited furnace carbon black having a pH value of from 2 to 6, with about 0.1 to 10.1 parts by weight of bis($\alpha,\alpha'$-dimethylbenzyl) peroxide and about 0.1 to 2.5 parts by weight of hexa[1 - (2-methyl)aziridinyl]triphosphatriazine.

References Cited by the Examiner
UNITED STATES PATENTS
| | | | |
|---|---|---|---|
| 2,985,632 | 5/1961 | Willis | 260—41.5 |
| 3,004,005 | 10/1961 | Malz et al. | 260—41.5 |
| 3,024,092 | 3/1962 | Gessler | 260—41.5 |

OTHER REFERENCES
Chemical Abstracts, 52, 21209d (1958).

ALLAN LIEBERMAN, *Acting Primary Examiner.*
LEON J. BERCOVITZ, MORRIS LIEBMAN,
*Examiners.*
B. S. LEON, K. B. CLARKE, J. S. WALDRON,
*Assistant Examiners.*